US011979878B2

(12) United States Patent
Jung et al.

(10) Patent No.: US 11,979,878 B2
(45) Date of Patent: May 7, 2024

(54) METHOD AND APPARATUS FOR TRANSMITTING AND RECEIVING BROADCAST SIGNAL IN COMMUNICATION SYSTEM

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Nam Ho Hur, Daejeon (KR); Seok Ki Ahn, Daejeon (KR); Sung Jun Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 242 days.

(21) Appl. No.: 17/499,406

(22) Filed: Oct. 12, 2021

(65) Prior Publication Data

US 2022/0124766 A1 Apr. 21, 2022

(30) Foreign Application Priority Data

Oct. 16, 2020 (KR) .................. 10-2020-0134187
Dec. 4, 2020 (KR) .................. 10-2020-0168879
(Continued)

(51) Int. Cl.
H04W 72/1273 (2023.01)
H04W 72/044 (2023.01)
(Continued)

(52) U.S. Cl.
CPC ..... *H04W 72/1273* (2013.01); *H04W 72/044* (2013.01); *H04W 72/23* (2023.01)

(58) Field of Classification Search
CPC .......... H04W 72/1273; H04W 72/044; H04W 72/23; H04W 72/0453
See application file for complete search history.

(56) References Cited

U.S. PATENT DOCUMENTS

2019/0223160 A1 7/2019 He et al.
2020/0162208 A1 5/2020 Moon et al.
(Continued)

FOREIGN PATENT DOCUMENTS

WO WO2019/132559 7/2019

*Primary Examiner* — Mohammad S Anwar
*Assistant Examiner* — Kenneth P Hunt

(57) ABSTRACT

An operation method of a terminal in a communication system may comprise: performing a monitoring operation to receive BWP configuration information for common downlink communication; in response to receiving the BWP configuration information from the base station, configuring a common frequency region for the common downlink communication based on the BWP configuration information; receiving DCI including scheduling information of the common downlink communication from the base station; and performing the common downlink communication with the base station in the common frequency region by using a frequency resource indicated by the scheduling information, wherein the common downlink communication is communication between the base station and a plurality of terminals including the terminal.

19 Claims, 9 Drawing Sheets

(30) Foreign Application Priority Data

| Mar. 25, 2021 | (KR) | ......................... 10-2021-0039138 |
| May 6, 2021 | (KR) | ......................... 10-2021-0058765 |
| Jul. 20, 2021 | (KR) | ......................... 10-2021-0095114 |
| Sep. 23, 2021 | (KR) | ......................... 10-2021-0125702 |

(51) Int. Cl.
*H04W 72/0453*       (2023.01)
*H04W 72/23*       (2023.01)

(56) References Cited

U.S. PATENT DOCUMENTS

| 2020/0236653 | A1 | 7/2020 | Astrom et al. | |
| 2020/0280971 | A1 | 9/2020 | Moon et al. | |
| 2020/0351837 | A1 | 11/2020 | Hwang et al. | |
| 2020/0358557 | A1* | 11/2020 | Park | ........................ H04B 7/024 |
| 2021/0007127 | A1 | 1/2021 | Hwang et al. | |
| 2021/0127367 | A1* | 4/2021 | Yi | ........................ H04W 72/23 |
| 2021/0360665 | A1* | 11/2021 | Takahashi | ............. H04L 5/0092 |
| 2022/0046689 | A1* | 2/2022 | Lee | ........................ H04L 5/0053 |
| 2023/0040690 | A1* | 2/2023 | Chen | .................... H04L 5/0091 |
| 2023/0180269 | A1* | 6/2023 | Li | ........................ H04W 72/30 |
| | | | | 370/312 |
| 2023/0199739 | A1* | 6/2023 | Zhou | .................... H04W 72/30 |
| | | | | 370/329 |

\* cited by examiner

METHOD AND APPARATUS FOR TRANSMITTING AND RECEIVING BROADCAST SIGNAL IN COMMUNICATION SYSTEM

CROSS-REFERENCE TO RELATED APPLICATIONS

This application claims priority to Korean Patent Applications No. 10-2020-0134187 filed on Oct. 16, 2020, No. 10-2020-0168879 filed on Dec. 4, 2020, No. 10-2021-0039138 filed on Mar. 25, 2021, No. 10-2021-0058765 filed on May 6, 2021, No. 10-2021-0095114 filed on Jul. 20, 2021, and No. 10-2021-0125702 filed on Sep. 23, 2021 with the Korean Intellectual Property Office (KIPO), the entire contents of which are hereby incorporated by reference.

BACKGROUND

1. Technical Field

The present disclosure relates to a technique for transmitting and receiving a broadcast signal in a communication system, and more particularly, to a technique for downlink communication based on a broadcast scheme.

2. Related Art

With the development of information and communication technology, various wireless communication technologies have been developed. The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like. Communication technologies for satisfying the requirements of eMBB, URLLC, and mMTC are required.

In the NR communication system, a base station may transmit common data (e.g., the same data) to a plurality of terminals. In order to transmit common data to a plurality of terminals, a common transmission resource may be required, and methods for configuring the common transmission resource are required.

Meanwhile, the above-described technologies are described to enhance the understanding of the background of the present disclosure, and they may include non-prior arts that are not already known to those of ordinary skill in the art.

SUMMARY

Accordingly, exemplary embodiments of the present disclosure are directed to providing methods and apparatuses for configuring a transmission resource of broadcast communication in a communication system.

According to a first exemplary embodiment of the present disclosure, an operation method of a terminal in a communication system may comprise: performing a monitoring operation to receive bandwidth part (BWP) configuration information for common downlink communication; in response to receiving the BWP configuration information from the base station, configuring a common frequency region for the common downlink communication based on the BWP configuration information; receiving downlink control information (DCI) including scheduling information of the common downlink communication from the base station; and performing the common downlink communication with the base station in the common frequency region by using a frequency resource indicated by the scheduling information, wherein the common downlink communication is communication between the base station and a plurality of terminals including the terminal.

A starting position of the common frequency region indicated by the BWP configuration information may be indicated with reference to a Point A.

The DCI may be scrambled by a common radio network temporary identifier (RNTI) for the common downlink communication.

The number of bits of frequency domain resource assignment (FDRA) in the scheduling information may be determined based on the number of resource blocks (RBs) included in the common frequency region configured based on the BWP configuration information.

The BWP configuration information may further include information indicating rate-matching for the common frequency region, and downlink data in the common downlink communication may be obtained by performing the rate-matching for the common frequency region.

When the BWP configuration information is not received from the base station, the common frequency region may be configured as a frequency region of a control resource set 0 (CORESET0).

The number of bits of FDRA in the scheduling information may be determined based on the number of RBs included in the common frequency region configured based on the CORESET0, and the frequency resource indicated by the FDRA may be limited within the frequency region of the CORESET0.

When the BWP configuration information is not received from the base station and a CORESET0 is not configured, the common frequency region may be configured as a frequency region of an initial BWP.

The number of bits of FDRA in the scheduling information may be determined based on the number of RBs included in the common frequency region configured based on the initial BWP, and the frequency resource indicated by the FDRA may be limited within the frequency region of the initial BWP.

According to a second exemplary embodiment of the present disclosure, an operation method of a base station in a communication system may comprise: transmitting BWP configuration information for common downlink communication to a terminal; transmitting DCI including scheduling information of the common downlink communication to the terminal; and performing the common downlink communication with the terminal within a common frequency region indicated by the BWP configuration information by using a frequency resource indicated by the scheduling information, wherein the common downlink communication is communication between the base station and a plurality of terminals including the terminal.

A starting position of the common frequency region indicated by the BWP configuration information may be indicated with reference to a Point A.

The DCI may be scrambled by a common radio network temporary identifier (RNTI) for the common downlink communication.

The number of bits of frequency domain resource assignment (FDRA) in the scheduling information may be determined based on a number of resource blocks (RBs) included in the common frequency region configured based on the BWP configuration information.

The BWP configuration information may further include information indicating rate-matching for the common frequency region, and downlink data in the common downlink communication may be transmitted by performing the rate-matching for the common frequency region.

According to a third exemplary embodiment of the present disclosure, a terminal in a communication system may comprise: a processor; a memory electronically communicating with the processor; and instructions stored in the memory, wherein when executed by the processor, the instructions cause the terminal to: perform a monitoring operation to receive BWP configuration information for common downlink communication; in response to receiving the BWP configuration information from the base station, configure a common frequency region for the common downlink communication based on the BWP configuration information; receive DCI including scheduling information of the common downlink communication from the base station; and perform the common downlink communication with the base station in the common frequency region by using a frequency resource indicated by the scheduling information, wherein the common downlink communication is communication between the base station and a plurality of terminals including the terminal.

A starting position of the common frequency region indicated by the BWP configuration information may be indicated with reference to a Point A.

The DCI may be scrambled by a common radio network temporary identifier (RNTI) for the common downlink communication.

The number of bits of frequency domain resource assignment (FDRA) in the scheduling information may be determined based on the number of resource blocks (RBs) included in the common frequency region configured based on the BWP configuration information.

When the BWP configuration information is not received from the base station, the common frequency region may be configured as a frequency region of a control resource set 0 (CORESET0), the number of bits of FDRA in the scheduling information may be determined based on the number of RBs included in the common frequency region configured based on the CORESET0, and the frequency resource indicated by the FDRA may be limited within the frequency region of the CORESET0.

When the BWP configuration information is not received from the base station and a CORESET0 is not configured, the common frequency region may be configured as a frequency region of an initial BWP, the number of bits of FDRA in the scheduling information may be determined based on the number of RBs included in the common frequency region configured based on the initial BWP, and the frequency resource indicated by the FDRA may be limited within the frequency region of the initial BWP.

According to the present disclosure, a first bandwidth part (BWP) for individual downlink communication and a second BWP for common downlink communication may be configured. The first BWP and the second BWP may be switched according to a preset rule, and the common downlink communication may be performed in the activated second BWP. Alternatively, a first resource region for individual downlink communication and a second resource region for common downlink communication may be configured within one BWP. When the common downlink communication is enabled, the common downlink communication may be performed by using the second resource region.

DETAILED DESCRIPTION OF THE EMBODIMENTS

Figure 1:
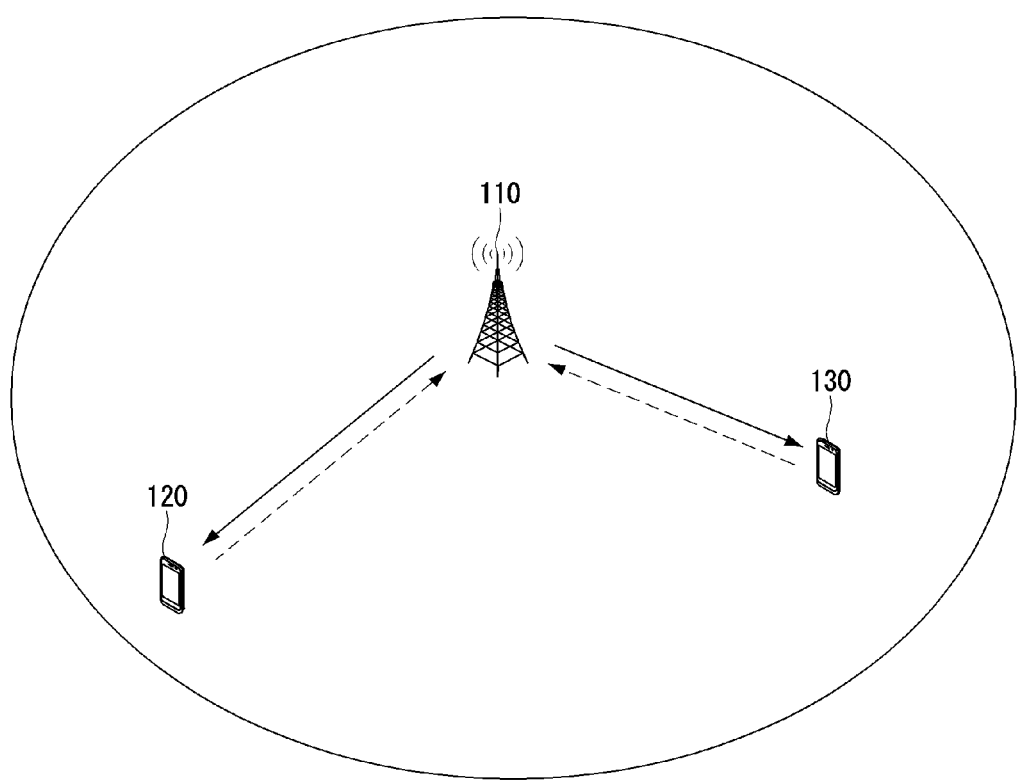
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In the embodiments of the present disclosure, "at least one of A and B" may mean "at least one of A or B" or "at least one of combinations of one or more of A and B". Also, in the embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a base station 110 may support cellular communication (e.g., long term evolution (LTE), LTE-advance (LTE-A), LTE-A Pro, LTE-unlicensed (LTE-U), new radio (NR), and NR-unlicensed (NR-U) specified in the $3^{rd}$ generation partnership project (3GPP) specifications), or the like. The base station 110 may support multiple input multiple output (MIMO) (e.g., single-user MIMO (SU-MIMO), multi-user MIMO (MU-MIMO), massive MIMO, etc.), coordinated multipoint (CoMP), carrier aggregation (CA), or the like. The base station 110 may transmit a downlink channel and/or signal to a first terminal 120. The first terminal 120 may receive the downlink channel and/or signal from the base station 110. The first terminal 120 may transmit an uplink channel and/or signal to the base station 110. The base station 110 may receive the uplink channel and/or signal from the first terminal 120. A second terminal 130 may perform downlink communication and/or uplink communication with the base station 110 in the same or similar manner as the first terminal 120.

The communication node (i.e., base station, terminal, etc.) constituting the communication network described above may supporting a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, evolved Node B, 5G Node B (gNodeB), base transceiver station (BTS), radio base station, radio transceiver, access point, access node, transmission/reception point (Tx/Rx Point), or the like. Among the communication nodes, the terminal may be referred to as a user equipment (UE), access terminal, mobile terminal, station, subscriber station, portable subscriber station, mobile station, node, device, or the like. The communication node may have the following structure.

Figure 2:
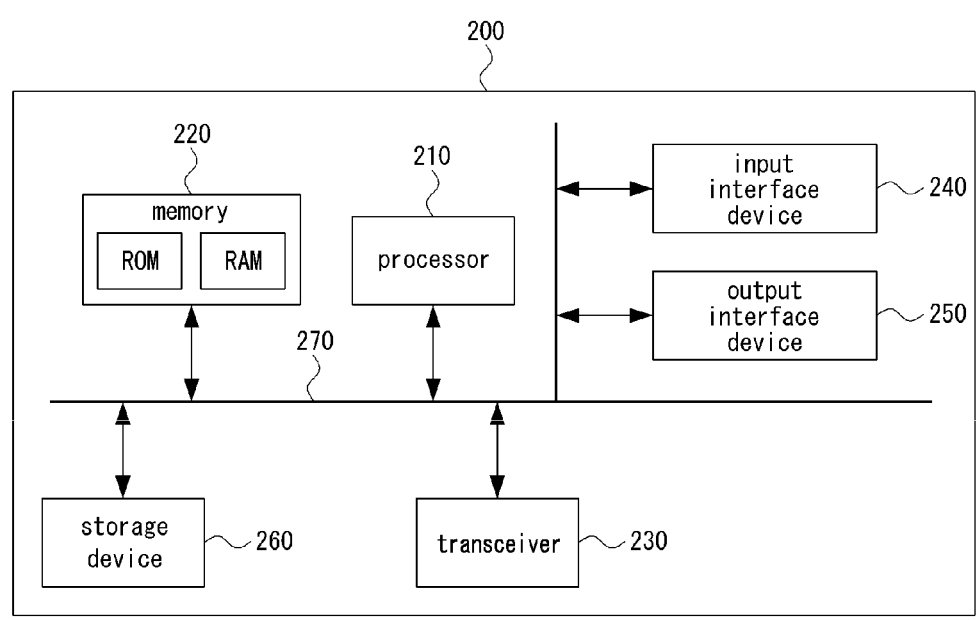
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, operation methods of a communication node in a communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 3:
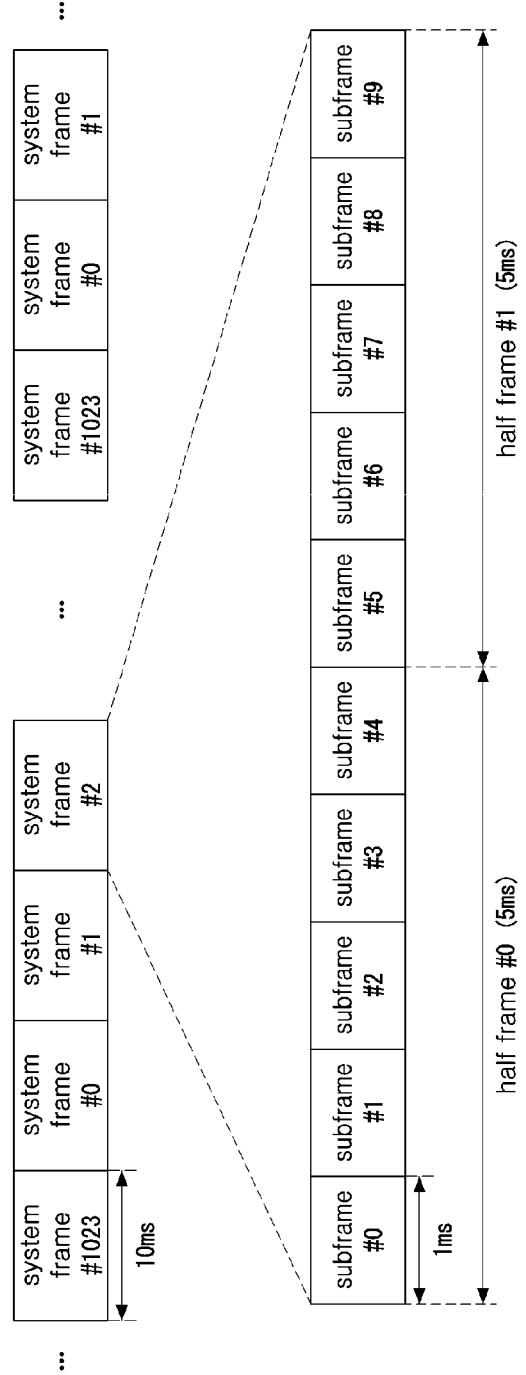
FIG. 3 is a conceptual diagram illustrating a first exemplary embodiment of a system frame in a communication system.

FIG. 3 is a conceptual diagram illustrating a first exemplary embodiment of a system frame in a communication system.

Referring to FIG. 3, time resources in a communication network may be divided into frames. For example, system frames each of which has a length of 10 milliseconds (ms) may be configured consecutively in the time domain of the communication system. System frame numbers (SFNs) may be set to #0 to #1023. In this case, 1024 system frames may be repeated in the time domain of the communication system. For example, an SFN of a system frame after the system frame #1023 may be set to #0.

One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include 10 subframes, and the length of one subframe may be 1 ms. 10 subframes within one system frame may be referred to as 'subframes #0 to #9'.

Figure 4:
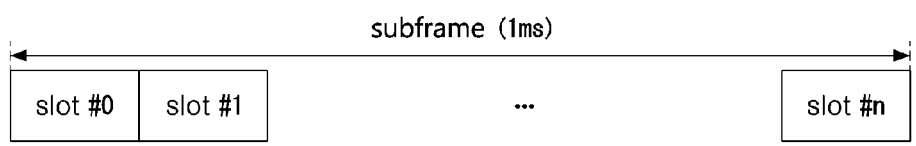
FIG. 4 is a conceptual diagram illustrating a first exemplary embodiment of a subframe in a communication system.

FIG. 4 is a conceptual diagram illustrating a first exemplary embodiment of a subframe in a communication system.

Referring to FIG. 4, one subframe may include n slots, and n may be a natural number. Accordingly, one subframe may be composed of one or more slots.

Figure 5:
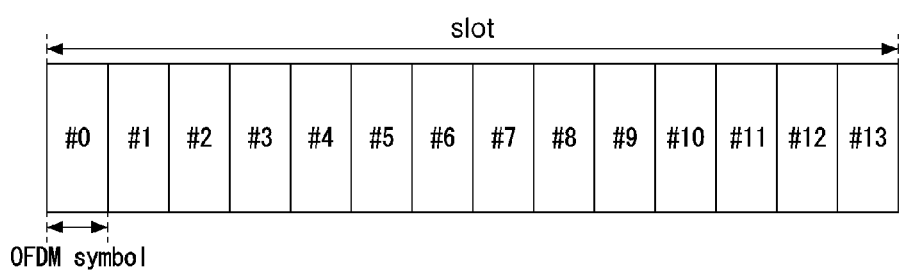
FIG. 5 is a conceptual diagram illustrating a first exemplary embodiment of a slot in a communication system.

FIG. 5 is a conceptual diagram illustrating a first exemplary embodiment of a slot in a communication system.

Referring to FIG. 5, one slot may comprise one or more symbols. One slot shown in FIG. 5 may be composed of 14 symbols. Here, the length of the slot may vary depending on the number of symbols included in the slot and the length of the symbol. Alternatively, the length of the slot may vary according to a numerology. When a subcarrier spacing is 15 kHz (e.g., $\mu=0$), the length of the slot may be 1 ms. In this case, one system frame may include 10 slots. When the subcarrier spacing is 30 kHz (e.g., $\mu=1$), the length of the slot may be 0.5 ms. In this case, one system frame may include 20 slots.

When the subcarrier spacing is 60 kHz (e.g., $\mu=2$), the length of the slot may be 0.25 ms. In this case, one system frame may include 40 slots. When the subcarrier spacing is 120 kHz (e.g., $\mu=3$), the length of the slot may be 0.125 ms. In this case, one system frame may include 80 slots. When the subcarrier spacing is 240 kHz (e.g., $\mu=4$), the length of the slot may be 0.0625 ms. In this case, one system frame may include 160 slots.

The symbol may be configured as a downlink (DL) symbol, a flexible symbol, or an uplink (UL) symbol. A slot composed only of DL symbols may be referred to as 'DL slot', a slot composed only of FL symbols may be referred to as 'FL slot', and a slot composed only of UL symbols may be referred to as 'UL slot'.

A reference signal may be a channel state information-reference signal (CSI-RS), a sounding reference signal (SRS), a demodulation-reference signal (DM-RS), a phase tracking-reference signal (PT-RS), or the like. A channel may be a physical downlink control channel (PDCCH), a physical downlink shared channel (PDSCH), a physical uplink control channel (PUCCH), a physical uplink shared channel (PUSCH), a physical sidelink control channel (PSCCH), a physical sidelink shared channel (PSSCH), or the like. In exemplary embodiments below, a control channel may refer to a PDCCH, PUCCH, or PSCCH, and a data channel may refer to a PDSCH, PUSCH, or PSSCH.

Figure 6:
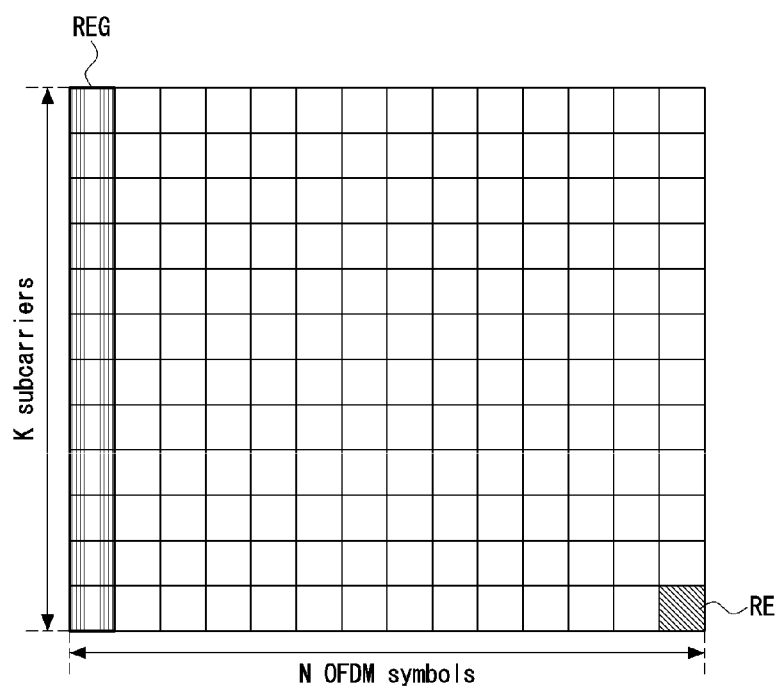
FIG. 6 is a conceptual diagram illustrating a first exemplary embodiment of time-frequency resources in a communication system.

FIG. 6 is a conceptual diagram illustrating a first exemplary embodiment of time-frequency resources in a communication system.

Referring to FIG. 6, a resource configured with one OFDM symbol in the time domain and one subcarrier in the frequency domain may be defined as a 'resource element (RE)'. Resources configured with one OFDM symbol in the time domain and K subcarriers in the frequency domain may be defined as a 'resource element group (REG)'. One REG may include K REs. The REG may be used as a basic unit of resource allocation in the frequency domain. K may be a natural number. For example, K may be 12. N may be a natural number. N in the slot shown in FIG. 5 may be 14, and N in the slot shown in FIG. 6 may be 7. The N OFDM symbols may be used as a basic unit of resource allocation in the time domain.

Downlink data may be transmitted on a physical downlink shared channel (PDSCH). The base station may transmit configuration information of the PDSCH to the terminal on a physical downlink control channel (PDCCH). The terminal may obtain the configuration information (e.g., scheduling information) of the PDSCH by receiving the PDCCH (e.g., downlink control information (DCI)). For example, the configuration information of the PDSCH may include a modulation and coding scheme (MCS) used for transmission and reception of the PDSCH, time resource information of the PDSCH, frequency resource information of the PDSCH, feedback resource information of the PDSCH, and/or the like. The PDSCH may refer to a radio resource through which the downlink data is transmitted and received. Alternatively, the PDSCH may refer to the downlink data itself. The PDCCH may refer to a radio resource through which the downlink control information (e.g., DCI) is transmitted and received. Alternatively, the PDCCH may refer to the downlink control information itself.

Figure 7:
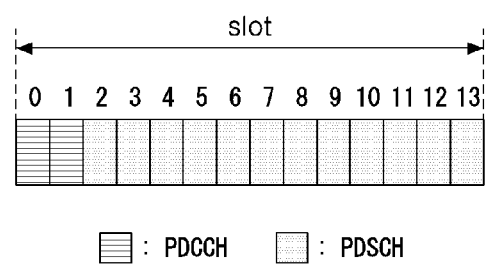
FIG. 7 is a conceptual diagram illustrating a second exemplary embodiment of a slot in a communication system.

FIG. 7 is a conceptual diagram illustrating a second exemplary embodiment of a slot in a communication system.

Referring to FIG. 7, one slot may include 14 symbols in the time domain. Here, the symbol may be an OFDM symbol. Among the 14 symbols, some symbol(s) may be configured as a PDCCH (e.g., PDCCH resource), and the remaining symbols may be configured as a PDSCH (e.g., PDSCH resource). The PDCCH may be mapped from the starting symbol (e.g., symbol #0) of the slot. For example, the PDCCH may be mapped to the symbols #0 and #1. The PDSCH may be mapped from the symbol (e.g., symbol #2) after the ending symbol (e.g., symbol #1) of the PDCCH. For example, the PDSCH may be mapped to the symbols #2 to #13. The above-described mapping scheme may be referred to as 'PDSCH mapping type A'. That is, when the PDSCH mapping type A is used, the PDCCH may be mapped from the starting symbol of the slot, and the PDSCH may be mapped from the symbol after the ending symbol of the PDCCH. In this case, the length of the PDSCH in the time domain may be 4, 5, 6, 7, 8, 9, 10, 11, 12, or 13 symbols.

The base station may configure a bandwidth part (BWP) for downlink communication. The BWP may be configured differently for each terminal. The base station may inform the terminal of configuration information of the BWP by using higher layer signaling. The higher layer signaling may refer to a transmission operation of system information and/or a transmission operation of a radio resource control (RRC) message. The number of BWPs configured for one terminal may be equal to or greater than 1. The terminal may receive the configuration information of the BWP from the base station, and may identify the BWP(s) configured by the base station based on the configuration information of the BWP. When a plurality of BWPs are configured for downlink communication, the base station may activate one or more BWPs among the plurality of BWPs. The base station may transmit configuration information of the activated BWP(s) to the terminal by using one or more among higher layer signaling, a medium access control (MAC) control element (CE), and DCI. The base station may perform downlink communication by using the activated BWP(s). The terminal may identify the activated BWP(s) by receiving the configuration information of the activated BWP(s) from the base station, and may perform a downlink reception operation in the activated BWP(s).

In exemplary embodiments below, PDCCH monitoring methods will be described. The terminal may perform a PDCCH monitoring operation in order to receive a PDSCH transmitted from the base station. The base station may inform the terminal of configuration information of the PDCCH monitoring operation by using a higher layer message (e.g., radio resource control (RRC) message). The configuration information of the PDCCH monitoring operation may include information on control resource set(s) (CORESET(s)) and information on search space(s).

The information on CORESET(s) may include PDCCH demodulation reference signal (DMRS) information, PDCCH precoding information, PDCCH occasion information, and the like. The PDCCH DMRS may be a DMRS used to demodulate a PDCCH. The PDCCH occasion may be a region in which a PDCCH can exist. That is, the PDCCH occasion may be a region in which DCI can be transmitted. The PDCCH occasion may be referred to as a 'PDCCH candidate'. The PDCCH occasion information may include time resource information and frequency resource information of the PDCCH occasion. The length of the PDCCH occasion in the time domain may be indicated in units of symbols. The size of the PDCCH occasion in the frequency domain may be indicated in units of resource blocks (RBs) (e.g., physical resource blocks (PRBs) or common resource blocks (CRBs)).

The search space information may include a identifier (ID) of a CORESET associated with a search space, a periodicity of PDCCH monitoring, and/or an offset. Each of the periodicity and offset of the PDCCH monitoring may be indicated in units of slots. In addition, the search space information may further include an index of a symbol from which the PDCCH monitoring operation is started.

Figure 8:
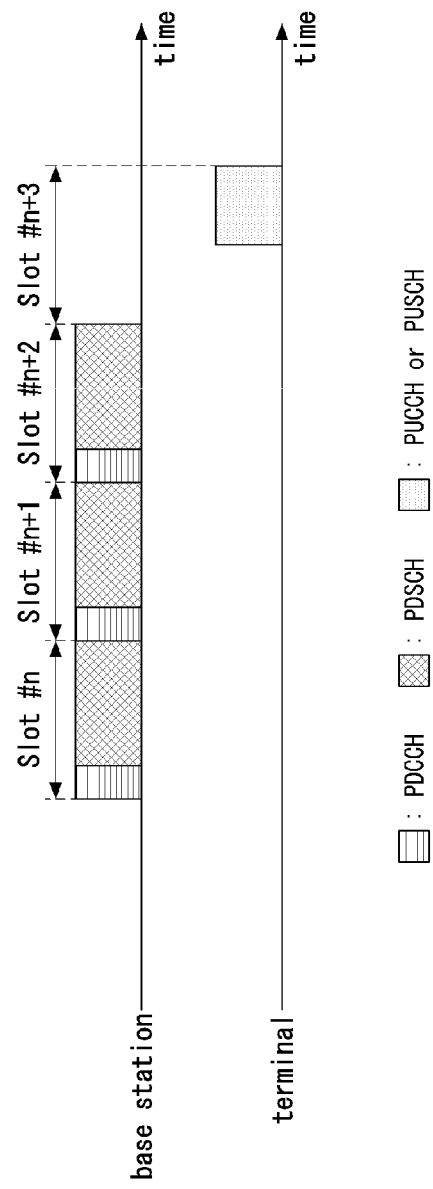
FIG. 8 is a conceptual diagram illustrating a first exemplary embodiment of a scheduling method in a communication system.

FIG. 8 is a conceptual diagram illustrating a first exemplary embodiment of a scheduling method in a communication system.

Referring to FIG. 8, the base station may transmit a control channel (e.g., PDCCH) and a data channel (e.g., PDSCH) scheduled by the PDCCH (e.g., DCI) to the terminal in a slot #n. The terminal may obtain the DCI by performing a PDCCH monitoring operation. The DCI may include information (e.g., scheduling information) required for reception of the PDSCH. The terminal may obtain time and frequency resource information, MCS information, etc. of the PDSCH (e.g., PDSCH of the slot #n) by receiving the PDCCH in the slot #n. In exemplary embodiments below, the PDCCH (e.g., DCI) of the slot #n may refer to a PDCCH (e.g., DCI) transmitted or received in the slot #n, and the PDSCH of the slot #n may refer to a PDSCH transmitted or received in the slot #n. n may be an integer greater than or equal to 0.

The base station may perform downlink communication with one or more terminals. In this case, the base station may schedule the same PDSCH (e.g., common PDSCH) for the one or more terminals. For example, the base station may schedule the same PDSCH for the one or more terminals by using a UE-specific PDCCH (e.g., UE-specific DCI). The UE-specific PDCCH may be a PDCCH transmitted through a UE-specific search space (or UE-specific search space set). The UE-specific PDCCH may be scrambled by a UE-specific RNTI. The UE-specific PDCCH may refer to DCI including information element(s) applied to a specific terminal. The base station may perform scheduling for the same PDSCH by using different RNTIs for different terminals or terminals having different RNTIs. The different RNTIs may be used for scrambling of DCI scheduling the same PDSCH.

The terminal may receive the UE-specific PDCCH by performing a monitoring operation on the UE-specific search space (or UE-specific search space set). The UE-specific PDCCH may be received by using a UE-specific RNTI. The terminal may receive the PDSCH (e.g., common PDSCH) based on the information element(s) included in the UE-specific PDCCH.

Alternatively, the base station may schedule the same PDSCH for the one or more terminals by using a group common PDCCH. The group common PDCCH may be transmitted through a common search space (or common search space set). The group common PDCCH may be scrambled by using a common RNTI, and the common RNTI may be used by a plurality of terminals. The group common PDCCH may be DCI including information element(s) commonly applied to the plurality of terminals. The base station may schedule a PDSCH for different terminals by using the same RNTI (e.g., common RNTI).

The terminal may receive a group common PDCCH by performing a monitoring operation on the common search space (or common search space set). The group common PDCCH may be received by using the common RNTI. The terminal may receive a PDSCH (e.g., common PDSCH) based on the information element(s) included in the group common PDCCH.

When scheduling the same PDSCH for one or more terminals, the base station may indicate (or configure) a scheduling scheme to the terminal by using a higher layer message (e.g., RRC message). Information indicating the scheduling scheme may be included in RRC configuration information. For example, the RRC configuration information may indicate that the same PDSCH is scheduled to one or more terminals through a UE-specific PDCCH or that the same PDSCH is scheduled to one or more terminals through a group common PDCCH. The terminal may identify the scheduling scheme by receiving the higher layer message (e.g., RRC configuration information) from the base station. For example, the terminal may identify that the same PDSCH is scheduled to one or more terminals through a UE-specific PDCCH or that the same PDSCH is scheduled to one or more terminals through a group common PDCCH.

The base station may indicate (or configure) a common RNTI used for transmission of a group common PDCCH or common PDSCH to the terminal by using a higher layer message (e.g., RRC configuration information). The terminal may identify the common RNTI used for transmission of a group common PDCCH or common PDSCH by receiving the higher layer message of the base station.

The base station may configure the same RNTI (hereinafter, referred to as 'MB-RNTI') for transmission of the same PDCCH and/or scheduling of the same PDSCH to one or more terminals. The base station may transmit configuration information of the MB-RNTI to the one or more terminals, and the one or more terminals may identify the MB-RNTI configured by the base station. That is, the MB-RNTI may be configured to the one or more terminals. The base station may transmit the same PDCCH to the one or more terminals by using the MB-RNTI. Here, the PDCCH may include scheduling information of the same PDSCH for the one or more terminals. The base station may schedule the same PDSCH for the one or more terminals by using the MB-RNTI. The terminal(s) may receive the PDCCH (e.g., DCI) from the base station by using the MB-RNTI, and may receive the same PDSCH based on the scheduling information included in the PDCCH.

The base station may schedule the same PDSCH to the one or more terminals. In order to schedule the same PDSCH to the one or more terminals, the base station may use a group common PDCCH or a UE-specific PDCCH. The terminal(s) may obtain the scheduling information by receiving the group common PDCCH or UE-specific PDCCH from the base station, and may receive the same PDSCH based on the scheduling information.

The base station may instruct (or configure) the terminal to perform a PDCCH monitoring operation on up to four DCIs having different sizes in one cell. The above-described indication may be transmitted through a higher layer message. In this case, the terminal may perform a PDCCH monitoring operation on up to four DCIs having different sizes in one cell. Up to three DCIs among the four DCIs may be scrambled by a cell (C)-RNTI. The remaining one or more DCIs may be scrambled by an RNTI other than the C-RNTI. The terminal may identify the size (or DCI type, DCI format) of DCI to be detected in each cell based on PDCCH monitoring information for a search space configured in a downlink BWP. The terminal may assume that the size (or DCI type, DCI format) of DCI having the MB-RNTI is the same as the size (or DCI type, DCI format) of DCI having the C-RNTI, and identify the number of DCIs having different sizes based on the above-mentioned assumption. The terminal may perform a PDCCH monitoring operation on up to four DCIs having different sizes in one cell. In this case, up to three DCIs among the four DCIs may be scrambled by the C-RNTI or the MB-RNTI. The remaining one or more DCIs may be scrambled by an RNTI other than the C-RNTI or the MB-RNTI.

Alternatively, the terminal may assume that the size (or DCI type, DCI format) of DCI having the MB-RNTI is different from the size (or DCI type, DCI format) of DCI having the C-RNTI, and may identify the number of DCIs having different sizes based on the above-mentioned assumption. The terminal may perform a PDCCH monitoring operation on up to four DCIs having different sizes in one cell. In this case, up to three DCIs among the four DCIs may be scrambled by the C-RNTI. The remaining one or more DCIs may be scrambled by an RNTI (e.g., MB-RNTI) other than the C-RNTI.

The base station may indicate (or configure) a common BWP to the terminal(s) in order to transmit the same PDSCH to one or more terminals. The common BWP may be used for broadcast communication, groupcast communication, and/or multicast communication. The common BWP may be configure independently of a BWP (e.g., individual BWP) for transmitting a PDSCH to each terminal.

Figure 9:
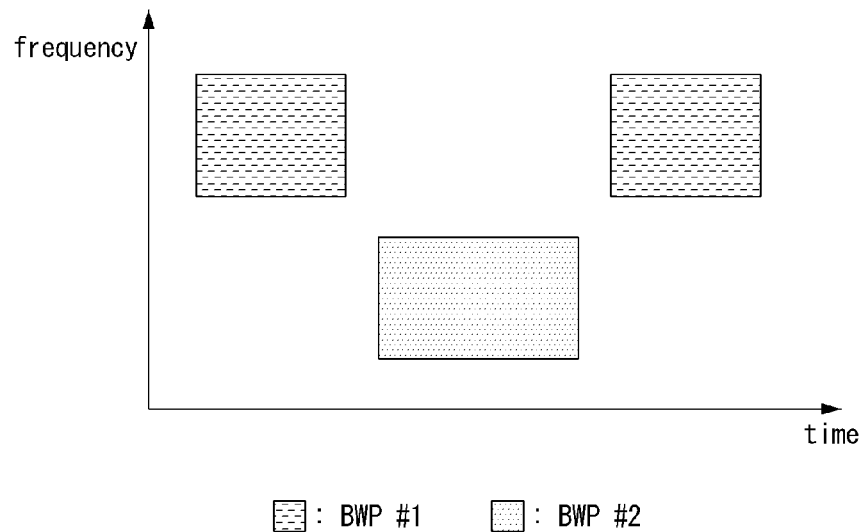
FIG. 9 is a conceptual diagram illustrating a first exemplary embodiment of a method for configuring a resource for signal transmission in a communication system.

FIG. 9 is a conceptual diagram illustrating a first exemplary embodiment of a method for configuring a resource for signal transmission in a communication system.

Referring to FIG. 9, the base station may perform common downlink communication by using a common BWP. When common downlink communication is performed, the base station may transmit the same downlink data to one or more terminals (e.g., a plurality of terminals). The base station may activate a BWP #1, and may perform downlink communication with each terminal in the activated BWP #1. Each terminal may receive downlink data from the base station in the BWP #1. Downlink communication performed in the BWP #1 may be performed in a unicast scheme. That is, individual downlink communication may be performed in the BWP #1.

The base station may configure a BWP #2 to transmit the same downlink data to one or more terminals, and may transmit configuration information of the BWP #2 to the terminal(s). The BWP #2 may be a common BWP. The configuration information of the BWP #2 may be transmitted to the terminal(s) by using at least one of a higher layer message (e.g., system information and/or RRC configuration information), MAC layer message (e.g., MAC control element (CE)), or physical layer message (e.g., DCI). The terminal(s) may identify the configuration information of the BWP #2 by receiving the above-described message(s) from the base station.

The BWP #2 (e.g., common BWP) may be configured independently of the BWP #1 (e.g., individual BWP). The common BWP may be used for broadcast communication, groupcast communication, and/or multicast communication, and the individual BWP may be used for unicast communication (e.g., individual downlink communication). The BWP #1 may be an initial BWP or a default BWP. Configuration information of the BWP #1 may be transmitted to the terminal by using at least one of a higher layer message, MAC layer message, or physical layer message. The configuration information of the BWP #1 and the configuration information of the BWP #2 may be included in configuration information of downlink BWPs.

Physical resources (e.g., time and frequency resources) of the BWP #2 may not overlap with physical resources of the BWP #1. Alternatively, the physical resource (e.g., time and frequency resources) of the BWP #2 may be partially overlapped or completely overlapped with the physical resource of the BWP #1. CORESET configuration and/or search space configuration (e.g., search space set configuration) in the BWP #2 may be independent of CORESET configuration and/or search space configuration in the BWP #1. Alternatively, the CORESET configuration and/or the search space configuration in the BWP #1 may be applied to the BWP #2.

The BWP #2 may be activated for common downlink communication. For example, the base station may transmit information indicating activation of the BWP #2 or information indicating that common downlink communication is enabled to the terminal(s) by using at least one of a higher layer message, MAC layer message, or physical layer message. The terminal may identify that the BWP #2 is activated based on the message(s) received from the base station. For example, the terminal may consider that common downlink communication is enabled as that the BWP #2 in which the common downlink communication is performed is activated. The base station may perform common downlink communication in the activated BWP #2, and the terminal(s) may receive downlink data from the base station in the activated BWP #2.

Hereinafter, methods for switching between the BWP #1 and the BWP #2 may be described. The BWPs activated for individual downlink communication and/or common downlink communication may be switched. For example, for individual downlink communication, the base station and the terminal may activate the BWP #1 and deactivate the BWP #2. For common downlink communication, the base station and the terminal may activate the BWP #2 and deactivate the BWP #1. The operation of deactivating the activated BWP and the operation of activating the deactivated BWP may be referred to as BWP switching operations.

The base station may set a BWP switching periodicity between the BWP #1 and the BWP #2, and may transmit configuration information of the BWP switching periodicity to the terminal by using at least one of a higher layer message, MAC layer message, or physical layer message. The configuration information of the BWP switching periodicity may be included in BWP configuration information (e.g., downlink BWP configuration information, BWP #1 configuration information, and/or BWP #2 configuration information), and the BW P switching periodicity may be set in units of symbols, minislots, or slots. The terminal may identify the BWP switching periodicity based on the message(s) received from the base station. The base station and the terminal may switch the BWPs according to the BWP switching periodicity. For example, the base station and the terminal may perform individual downlink communication in the activated BWP #1, may switch the activated BWP from the BWP #1 to the BWP #2 according to the BWP switching periodicity, and may perform common downlink communication in the activated BWP #2. In addition, the base station and the terminal may switch the activated BWP from the BWP #2 to the BWP #1 according to the BWP switching periodicity, and may perform individual downlink communication in the activated BWP #1.

Alternatively, the base station may set an activation periodicity #1 of the BWP #1, and may set an activation periodicity #2 of the BWP #2. The activation periodicity #1 of the BWP #1 may be set independently of the activation periodicity #2 of the BWP #2. The BWP #1 may be activated according to the activation periodicity #1, and the BWP #2 may be activated according to the activation periodicity #2. When the activation periodicity #1 is different from the activation periodicity #2, both the BWP #1 and the BWP #2 may be activated in the same time period. In this case, the base station and the terminal may consider that one BWP having a higher priority among the BWPs is activated. For example, the priority of the BWP #1 may be higher than that of the BWP #2. Alternatively, the priority of the BWP #2 may be higher than that of the BWP #1.

The base station may transmit configuration information of the activation periodicity #1 and/or configuration information of the activation periodicity #2 to the terminal(s) by using at least one of a higher layer message, MAC layer message, or physical layer message. The terminal(s) may identify the configuration information of the activation periodicity #1 and/or the configuration information of the activation periodicity #2 based on the message(s) received from the base station. The base station and the terminal may activate the BWP #1 according to the activation periodicity #1, and may activate the BWP #2 according to the activation periodicity #2. The configuration information of the activation periodicity #1 and/or the configuration information of the activation periodicity #2 may be included in the BWP configuration information.

The base station may transmit DCI including scheduling information for common downlink communication in the BWP #1. The DCI may further include information indicating a BWP (e.g., BWP #2) to which the scheduling information is applied (hereinafter, referred to as a 'BWP indicator'). The DCI may be scrambled by an RNTI configured for the common downlink communication. The terminal may receive the DCI in the BWP #1, and may perform the common downlink communication in the BWP #2 based on the scheduling information included in the DCI. When the BWP indicator included in the DCI received in the BWP #1 indicates the BWP #2 or when the DCI received in the BWP #1 is scrambled by the RNTI for common downlink communication performed in the BWP #2, the terminal may determine that the corresponding DCI is applied to the BWP #2.

The base station may indicate to the terminal(s) BWP switching from the BWP #1 to the BWP #2 by transmitting scheduling information for (common) downlink communication performed in the BWP #2 through the BWP #1. When the scheduling information for (common) downlink communication performed in the BWP #2 is received through the BWP #1, the terminal(s) may determine that BWP switching from the BWP #1 to the BWP #2 is requested. Accordingly, the terminal(s) may switch the activated BWP from the BWP #1 to the BWP #2.

When the (common) downlink communication is completed in the BWP #2, the base station may indicate to the terminal(s) BWP switching from the BWP #2 to the BWP #1. The base station may indicate to the terminal(s) the BWP switching from the BWP #2 to the BWP #1 by transmitting scheduling information for (individual) downlink communication performed in the BWP #1 through the BWP #2. When the scheduling information for (individual) downlink communication performed in the BWP #1 is received through the BWP #2, the terminal(s) may determine that the BWP switching from the BWP #2 to the BWP #1 is requested. Accordingly, the terminal(s) may switch the activated BWP from the BWP #2 to the BWP #1. Here, DCI including the scheduling information for (individual) downlink communication may further include a BWP indicator indicating the BWP #1. In addition, the DC may be scrambled by the RTNI configured for the individual downlink communication.

Alternatively, when the (common) downlink communication is completed in the BWP #2, the base station and/or terminal may switch the activated BWP from the BWP #2 to the BWP #1. The above-described switching operation may be performed without a separate switching indication. When (common) downlink communication is not scheduled in the BWP #2 for a preset time, the base station and/or terminal may switch the activated BWP from the BWP #2 to the BWP #1. The preset time may be set by the base station.

Meanwhile, individual downlink communication and common downlink communication may be performed within one BWP. In order to support this operation, resources may be configured as follows.

Figure 10:
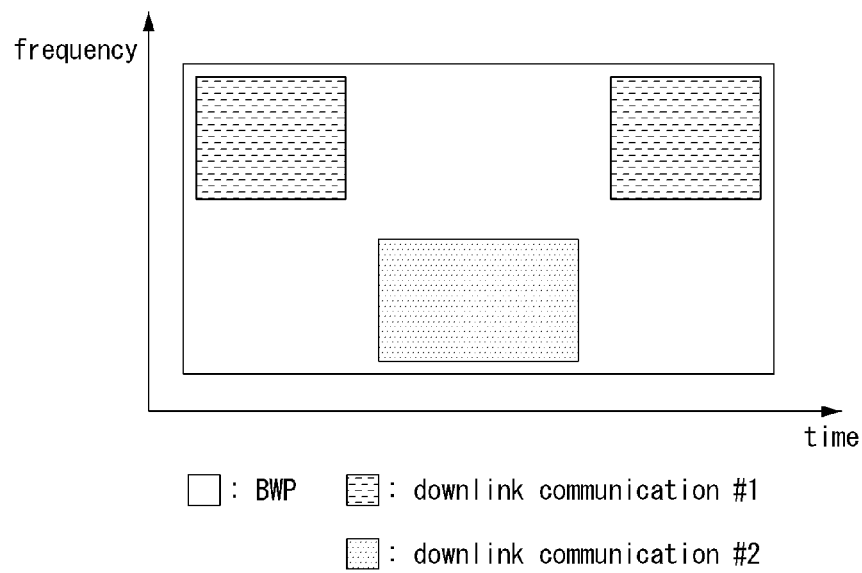
FIG. 10 is a conceptual diagram illustrating a second exemplary embodiment of a method for configuring a resource for signal transmission in a communication system.

FIG. 10 is a conceptual diagram illustrating a second exemplary embodiment of a method for configuring a resource for signal transmission in a communication system.

Referring to FIG. 10, downlink communication #1 (e.g., individual downlink communication) and downlink communication #2 (e.g., common downlink communication) may be performed within one BWP. In FIG. 10, the downlink communication #1 may refer to a resource region in which the downlink communication #1 is performed, and the downlink communication #2 may refer to a resource region in which the downlink communication #2 is performed. A frequency resource region in which the downlink communication #1 is performed may be different from a frequency resource region in which the downlink communication #2 is performed. Alternatively, the frequency resource region in which the downlink communication #1 is performed may partially overlap or completely overlap with the frequency resource region in which the downlink communication #2 is performed. Only the downlink communication #1 may be performed in the frequency resource region configured for the downlink communication #1. That is, the downlink communication #2 may not be performed in the frequency resource region configured for the downlink communication #1. Only the downlink communication #2 may be performed in the frequency resource region configured for the downlink communication #2. That is, the downlink communication #1 may not be performed in the frequency resource region configured for the downlink communication #2.

Hereinafter, methods for allocating (e.g., configuring) frequency resources for the downlink communication #2 (e.g., common downlink communication) will be described. The base station may configure a downlink BWP, and may transmit configuration information of the downlink BWP to the terminal(s) by using at least one of a higher layer message, MAC layer message, or physical layer message. The terminal(s) may identify the configuration information of the downlink BWP by receiving the message(s) from the base station. The configuration information of the downlink BWP may include information elements for the downlink communication #1 and/or information elements for the downlink communication #2. The information elements for the downlink communication #1 may indicate a resource region in which the downlink communication #1 is performed, and the information elements for the downlink communication #2 may indicate a resource region in which the downlink communication #2 is performed. The information elements for the downlink communication #2 may be referred to as 'BWP-multicast broadcast service (MBS) information' or 'MBS specific BWP information'. The base station may configure a BWP-Common commonly applied to terminals within the cell and a BWP-Dedicated applied to an individual terminal. The configuration information of the downlink BWP may include BWP-Common information and/or BWP-Dedicated information.

The terminal may configure the BWP based on the configuration information of the downlink BWP obtained from the base station. The terminal may identify BWP-MBS information, BWP-Common information, and/or BWP-Dedicated information included in the downlink BWP.

The base station may transmit a higher layer message, MAC layer message, and/or physical layer message including information indicating enable or disable of the downlink communication #2 (e.g., common downlink communication) to the terminal. The terminal may identify that the downlink communication #2 is enabled or the downlink communication #2 is disabled based on the message(s) received from the base station. When the downlink communication #2 is enabled, the terminal may perform the downlink communication #2 based on the BWP-MBS information. The BWP-MBS information may be received from the base station when the downlink communication #2 is enabled. When the downlink communication #2 is not enabled, the terminal may only perform the downlink communication #1.

The BWP-MBS information may include PDCCH configuration information and/or PDSCH configuration information. The PDCCH configuration information may include information elements required for PDCCH transmission (e.g., CORESET information and/or search space information). The PDSCH configuration information may include information elements required for PDSCH transmission (e.g., scrambling information, reference signal information, and resource allocation information). The BWP-MBS information may include semi-persistent scheduling (SPS)-config information. The SPS-config information may include information elements required for SPS (e.g., HARQ information, data transmission periodicity information, resource allocation information). The terminal may receive the BWP-MBS information from the base station, identify the PDCCH configuration information included in the BWP-MBS information, and identify the PDSCH configuration information included in the BWP-MBS information.

The BWP-MBS information may include configuration information of a frequency resource region for the downlink communication #2 within the BWP. The configuration information of the frequency resource region may include information on a starting point (e.g., subcarrier index, PRB index, offset), an ending point (e.g., subcarrier index, PRB index), and/or length (e.g., number of subcarriers, number of PRBs) of the frequency resource region. The starting position of the frequency resource region for the downlink communication #2 may be indicated by an offset from a specific position. The specific position may be a starting PRB of the BWP in which the downlink communication #2 is performed. Alternatively, the specific position may be a reference position (e.g., Point A) used to indicate the starting position of the BWP in which the downlink communication #2 is performed. The starting position of the downlink BWP in the frequency domain may be indicated by an offset from Point A. The starting position of the frequency resource region for the downlink communication #2 in the frequency domain may be indicated with reference to Point A. The offset may be indicated in units of RBs.

The terminal may identify the position of the frequency resource region for the downlink communication #2 within the BWP by receiving the BWP-MBS information. For example, the terminal may identify the starting position of the frequency resource region for the downlink communication #2 based on the starting PRB of the BWP. Alternatively, the terminal may identify the starting position of the frequency resource region for the downlink communication #2 based on Point A.

When the BWP-MBS information is not received, the terminal may consider that the position and/or size of the frequency resource region for the downlink communication #2 is the same as the position and/or size of the initial BWP. Configuration information of the initial BWP may be included in a system information block (SIB). Therefore, the terminal may identify the configuration information of the initial BWP included in the SIB received from the base station. Alternatively, when the BWP-MBS information is not received, the terminal may consider that the position and/or size of the frequency resource region for the downlink communication #2 is the same as the position and/or size of CORESET0. Configuration information of the CORESET0 may be included in a master information block (MIB). Therefore, the terminal may identify the configuration information of the CORESET0 included in the MIB received from the base station.

When the BWP-MBS information is not received, the terminal may consider that the PDCCH configuration information for the downlink communication #2 is the same as the configuration information of the CORESET0. Accordingly, the terminal may receive a PDCCH by using the configuration information of the CORESET0.

Figure 11:
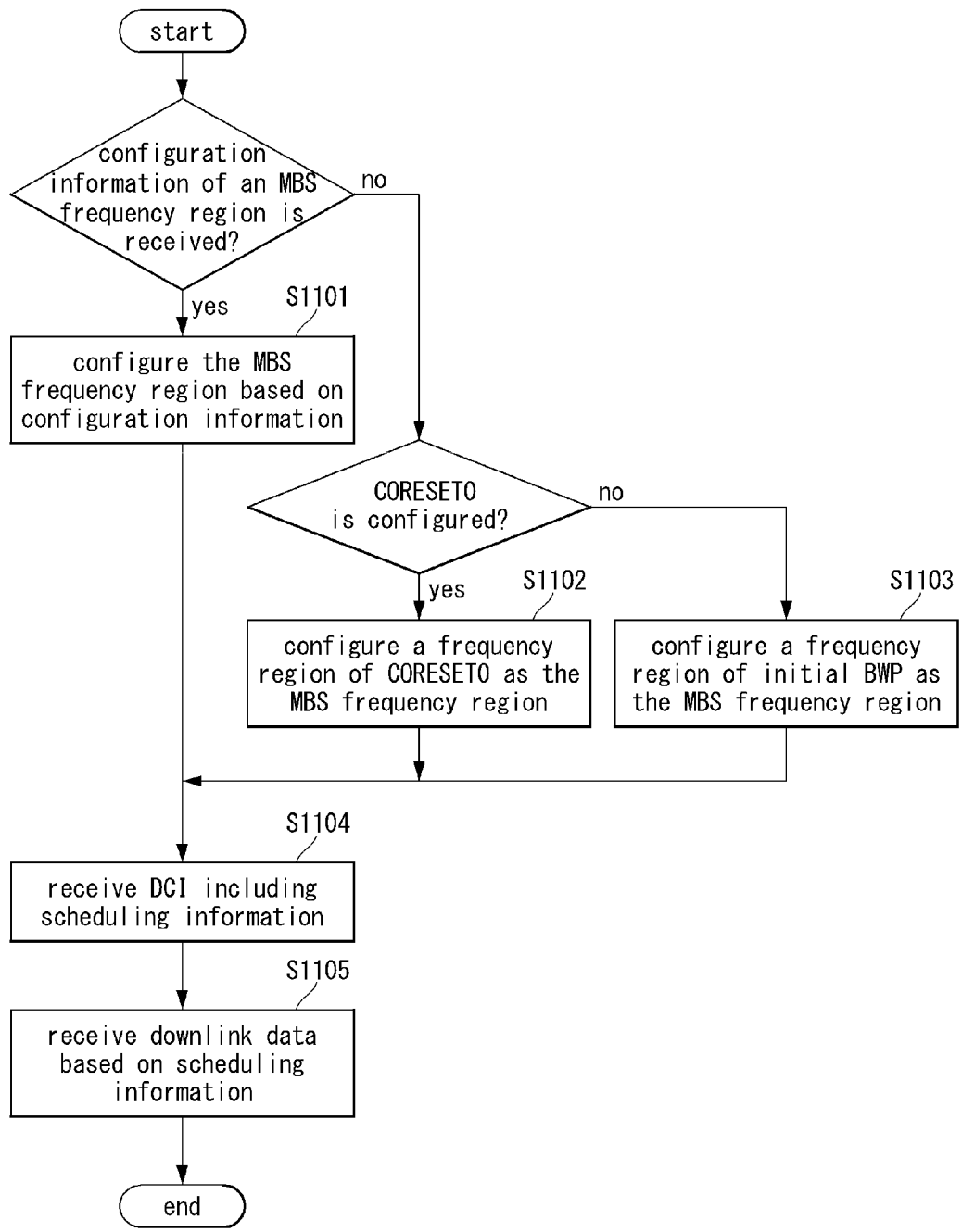
FIG. 11 is a flowchart illustrating a first exemplary embodiment of a method for configuring a downlink frequency region in a communication system.

FIG. 11 is a flowchart illustrating a first exemplary embodiment of a method for configuring a downlink frequency region in a communication system.

Referring to FIG. 11, the terminal may perform a monitoring operation to receive configuration information of an MBS frequency region. The configuration information of the MBS frequency region may be the above-described BWP-MBS information. The terminal may receive the configuration information of the MBS frequency region from the base station. The configuration information of the MBS frequency region may be transmitted to the terminal by using at least one of a higher layer message (e.g., RRC configuration information), MAC-CE, or DCI. Here, the higher layer message may include the configuration information for the MBS frequency region (e.g., configuration information for common downlink communication) and/or configuration information for individual downlink communication, and the terminal may receive the higher layer message to identify the above-described configuration information.

When the configuration information of the MBS frequency region is received, the terminal may configure the MBS frequency region based on the received configuration information (S1101). Downlink communication in the MBS frequency region may be performed when common downlink communication is enabled by the base station. When the configuration information of the MBS frequency region is not received (e.g., the higher layer message does not include the configuration information of the MBS frequency region), the terminal may identify whether the CORESET0 is configured. When the CORESET0 is configured (e.g., when the configuration information of the CORESET0 is received from the base station), the terminal may configure the frequency region of the CORESET0 to be the MBS frequency region (S1102). When the CORESET0 is not configured, the terminal may configure the frequency region of the initial BWP to be the MBS frequency region (S1103). The configuration information of the frequency region of the initial BWP may be included in the MIB received from the base station.

The base station may generate DCI for the downlink communication #2 (e.g., common downlink communication) within the BWP (e.g., MBS frequency region configured in the step S1101, S1102, or S1103). The DCI may include frequency domain resource assignment (FDRA), time domain resource assignment (TDRA), virtual resource block (VRB)-PRB mapping information, MCS, new data indicator (NDI), redundancy version (RV), hybrid automatic repeat request (HARQ) process number, and/or downlink assignment index (DAI). The base station may transmit scheduling information of the downlink communication #2 to the terminal(s) by using the DCI described above. The DCI including the scheduling information of the downlink communication #2 may be scrambled by the MB-RNTI.

The FDRA included in the DCI may indicate frequency resources in the frequency resource region configured by the BWP-MBS information (e.g., configuration information of MBS frequency region). When the frequency resource region is not configured by the BWP-MBS information and the CORESET0 is configured, the FDRA of the DCI may indicate frequency resources within the CORESET0. When the frequency resource region is not configured by the BWP-MBS information and the CORESET0 is not configured, the FDRA of the DCI may indicate frequency resources within the initial BWP.

The number of bits of the FDRA included in the DCI may be determined based on the number of RBs included in the frequency resource region configured by the BWP-MBS information (e.g., configuration information of MBS frequency region). Alternatively, the number of bits of the FDRA included in the DCI may be determined based on the number of RBs included in the frequency resource region configured by the CORESET0. Alternatively, the number of bits of the FDRA included in the DCI may be determined based on the number of RBs included in the frequency resource region configured by the initial BWP. The frequency resources for the downlink communication #2 may be indicated by using at least one of the FDRA included in the DCI, the configuration information of the frequency resource region included in the BWP-MBS information, the configuration information of the frequency resource region of the CORESET0, the configuration information of the frequency resource region of the initial BWP, or specific values. The specific values may vary according to configuration of the base station. Alternatively, the specific values may be constants defined in a technical specification.

The terminal may receive DCI for the downlink communication #2, and may identify the scheduling information for the downlink communication #2 included in the DCI (S1104). The DCI may be received by using the MB-RNTI. The DCI may be received within the MBS frequency region configured in the step S1101, S1102, or S1103. The terminal may interpret that the frequency resources (e.g., RBs) indicated by the FDRA included in the DCI are limited within the frequency resource region (e.g., RBs) indicated by the BWP-MBS information. For example, the terminal may interpret the lowest RB index indicated by the FDRA included in the DCI as the lowest RB index indicated by the BWP-MBS information. The terminal may interpret the highest RB index indicated by the FDRA included in the DCI as the highest RB index indicated by the BWP-MBS information. The terminal may interpret the frequency region indicated by the FDRA based on the length of the frequency resource region of the BWP-MBS.

When the frequency resource region is not configured by the BWP-MBS information and the CORESET0 is configured, the terminal may interpret that the frequency resources (e.g., RBs) indicated by the FDRA included in the DCI are limited within the frequency resource region (e.g., RBs) of the CORESET0. When the frequency resource region is not configured by the BWP-MBS information and the CORESET0 is not configured, the terminal may interpret that the frequency resources (e.g., RBs) indicated by the FDRA included in the DCI are limited within the frequency resource region (e.g., RBs) of the initial BWP.

The base station may configure a PDSCH resource in the remaining resource region excluding the resource region indicated by the BWP-MBS information. In a PDSCH resource mapping procedure, the base station may map the PDSCH resource to the remaining resource region excluding the resource region indicated by the BWP-MBS information. The base station may transmit downlink data by using the PDSCH resource.

In a PDSCH reception procedure, the terminal may receive downlink data based on scheduling information included in DCI (S1105). The step S1105 may be performed by using a frequency resource indicated by DCI within the MBS frequency region configured in the step S1101, S1102, or S1103. The terminal may consider that the PDSCH resource is configured in the remaining resource region excluding the resource region indicated by the BWP-MBS information. The terminal may receive the PDSCH by performing rate-matching for the resource region indicated by the BWP-MBS information. When the BWP-MBS information is received from the base station, the terminal may perform rate-matching for the resource region indicated by the BWP-MBS information. Here, the resource region indicated by the BWP-MBS information may be a resource region in which DCI for scheduling of the downlink communication #2 is transmitted, and the downlink data scheduled by the DCI may be transmitted by using a resource other than the resource region indicated by the BWP-MBS information.

The base station may transmit to the terminal information indicating whether to perform rate-matching for the resource region indicated by the BWP-MBS information by using at least one of a higher layer message, MAC layer message (e.g., MAC CE), or physical layer message (e.g., DCI). The terminal may obtain the information indicating whether to perform rate-matching for the resource region indicated by the BWP-MBS information from the message(s) received from the base station. The information indicating whether to perform rate-matching for the resource region indicated by the BWP-MBS information may be included in the configuration information of the downlink BWP. When the BWP-MBS information is received from the base station and it is indicated to perform rate-matching for the resource region indicated by the BWP-MBS information, the terminal may receive the PDSCH by performing rate-matching for the resource region indicated by the BWP-MBS information. When the BWP-MBS information is received from the base station and it is not indicated to perform rate-matching for the resource region indicated by the BWP-MBS information, the terminal may receive the PDSCH without performing rate-matching for the resource region indicated by the BWP-MBS information.

Hereinafter, periodic downlink communication methods for one or more terminals will be described.

Figure 12:
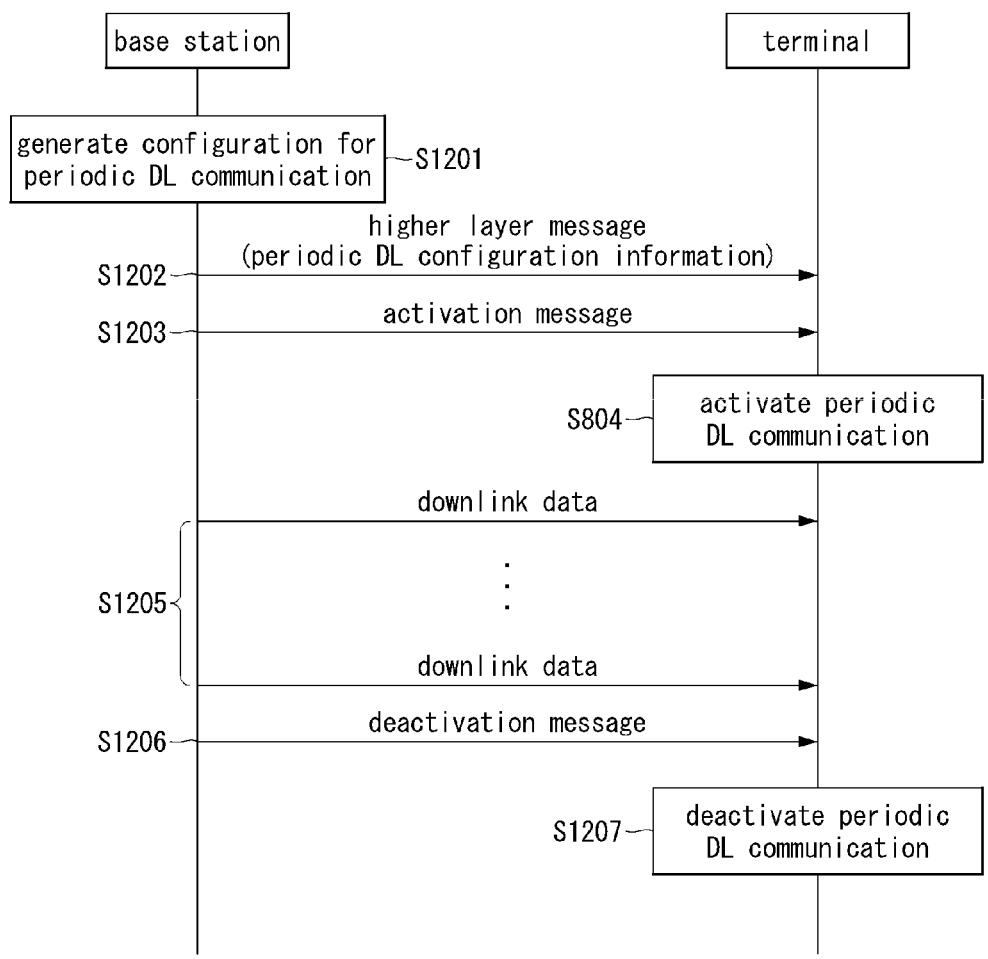
FIG. 12 is a sequence chart illustrating a first exemplary embodiment of a downlink communication method in a communication system.

FIG. 12 is a sequence chart illustrating a first exemplary embodiment of a downlink communication method in a communication system.

Referring to FIG. 12, a communication system may include a base station and a terminal. The base station may be the base station 110 shown in FIG. 1, and the terminal may be the first terminal 120 or the second terminal 130 shown in FIG. 1. Each of the base station and the terminal may be configured identically or similarly to the communication node 200 shown in FIG. 2.

The base station may generate configuration information (hereinafter, referred to as 'periodic downlink (DL) configuration information') for periodic DL communication (S1201). The periodic DL communication may be performed based on a semi-persistent scheduling (SPS) scheme, configured scheduling (CS) scheme, or configured grant (CG) scheme. The periodic DL communication shown in FIG. 12 may be 'periodic DL communication between one base station and one terminal' or 'periodic DL communication between one base station and a plurality of terminals'. Hereinafter, operations of a terminal may be interpreted as 'operations of a plurality of terminals'. The periodic DL configuration information may include one or more information elements (IEs) among IEs shown in Table 1 below.

TABLE 1

| IE | Description |
|---|---|
| Time periodicity | Time periodicity of DL transmission |
| Number of HARQ processes | Number of hybrid automatic repeat request (HARQ) processes used for periodic DL communication |
| HPN offset | HARQ process number (HPN) offset used for calculation of a HPN (e.g., HARQ index) in periodic DL communication |
| Feedback resource indicator | Feedback resource indicator indicating a HARQ-acknowledgement (HARQ-ACK) feedback resource in periodic DL communication |

The base station may transmit a higher layer message (e.g., system information and/or RRC message) including the periodic DL configuration information to the terminal (S1202). In the step S1202, the base station may transmit the higher layer message to a plurality of terminals. Here, the higher layer message may be a cell-common RRC message (e.g., cell-specific RRC message), BWP-common RRC message, and/or UE group-common RRC message. Configuration information included in the UE group-common RRC message may be information commonly applied to terminals belonging to a specific terminal group (or a specific terminal set). The terminal may receive the higher layer message (e.g., system information and/or RRC message) from the base station, identify the periodic DL configuration information (e.g., IEs defined in Table 1) included in the higher layer message, and configure periodic DL communication based on the periodic DL configuration information.

The periodic DL communication may be activated (e.g., triggered) by an activation message (e.g., DCI). The base station may generate an activation message for activating the periodic DL communication, and may transmit the activation message to the terminal (S1203). The activation message may be DCI (e.g., activation DCI). A combination of one or more fields included in the DCI may indicate activation of the periodic DL communication. In addition, when a plurality of periodic DL communications are configured by the base station, a combination of one or more fields included in the DCI may indicate one periodic DL communication to be activated among the plurality of periodic DL communications.

The DCI may be transmitted on a PDCCH, and a cyclic redundancy check (CRC) of the DCI may be scrambled by a radio network temporary identifier (RNTI) for the periodic DL communication. The base station may transmit the DCI by using a common RNTI to transmit the activation message to a plurality of terminals. For example, the base station may transmit the DCI by using a group-configured scheduling- RNTI (G-CS-RNTI) to activate periodic DL communication for one or more terminals. When periodic DL communication for one or more terminals is activated, the same downlink data may be transmitted to the one or more terminals. The DC scrambled by the G-CS-RNTI may be common DCI. The G-CS-RNTI may be configured by the base station, and the base station may transmit configuration information of the G-CS-RNTI to the terminal. The configuration information of the G-CS-RNTI may be transmitted to the terminal through a separate procedure before the S1202 or S1201.

The terminal may perform a reception operation of the activation message (e.g., DCI). For example, the terminal may receive the DCI by using the G-CS-RNTI, and may identify that periodic DL communication configured by the base station is activated based on a combination of one or more fields included in the DCI. In this case, the terminal may activate the periodic DL communication (S1204). Here, the terminal may periodically receive the common DCI. In addition, the terminal receiving the activation message (e.g., common DCI) may be a terminal capable of receiving a common PDSCH (e.g., common data). The common PDSCH may be downlink data transmitted periodically. In addition, the common PDSCH may be the same downlink data transmitted to the plurality of terminals.

When decoding of the activation message is successful, the terminal may transmit acknowledgment (ACK) for the activation message to the base station. When decoding of the activation message fails, the terminal may transmit negative ACK (NACK) for the activation message to the base station. After transmitting the activation message, the base station may perform a reception operation of HARQ-ACK for the activation message. In exemplary embodiments, the HARQ-ACK, HARQ response, HARQ feedback, and feedback information may be used with the same meaning. If ACK for the activation message is not received, the base station may retransmit the activation message. The case where ACK for the activation message is not received may be a case where NACK for the activation message is received and/or a case where HARQ-ACK for the activation message is not received within a preset period. That is, the base station may consider the case where HARQ-ACK for the activation message is not received within a preset period as the case where NACK for the activation message is received. The activation message may be retransmitted on a common PDCCH or a UE-specific PDCCH. For example, the activation message may be retransmitted to all terminals participating in the periodic DL communication or terminal(s) that transmitted NACK for the activation message. Alternatively, in the step of retransmitting the activation message, the base station may transmit a MAC message (e.g., MAC CE) including information indicating activation of the periodic DL communication to the terminal(s).

When the activation message is not successfully received, the terminal may perform the operation of receiving the activation message again. For example, the terminal may receive the retransmitted activation message by performing a monitoring operation on a common PDCCH and/or a UE-specific PDCCH. As another method, the terminal may receive the MAC message (e.g., MAC CE) including information indicating activation of the periodic DL communication from the base station.

The activation message transmitted in the step S1203 may include scheduling information (e.g., scheduling information for periodic DL communication). For example, the base station may transmit the higher layer message including a part of scheduling information (e.g., IEs defined in Table 1) for the periodic DL communication in the step S1202, and transmit the activation message including the remaining scheduling information (e.g., time domain resource assignment (TDRA), frequency domain resource assignment (FDRA), MCS, etc.) for the periodic DL communication in the step S1203. The terminal may identify the part of scheduling information for the periodic DL communication by receiving the higher layer message from the base station, and may identify the remaining scheduling information for the periodic DL communication by receiving the activation message from the base station.

After transmitting the activation message, the base station may periodically transmit downlink data (S1205). The downlink data may be transmitted through the time resource indicated by the activation message according to the periodicity indicated by the higher layer message. The downlink data may be common downlink data (e.g., common PDSCH) for a plurality of terminals. When periodic DL communication is activated (e.g., when the activation message is received), the terminal may perform a downlink data reception operation in the step S1205. The terminal may transmit a HARQ-ACK to the base station based on a reception result (e.g., decoding result) of the downlink data.

The base station may generate a deactivation message to deactivate the periodic DL communication. The base station may transmit the deactivation message (S1206). The deactivation message may be DCI (e.g., deactivation DCI), and a CRC of the DCI may be scrambled by a common RNTI (e.g., G-CS-RNTI). The DCI scrambled by the common RNTI may be common DCI. The DCI indicating deactivation of the periodic DL communication may be transmitted to one or more terminals by using a common RNTI. A combination of one or more fields included in the DCI may indicate deactivation of the periodic DL communication. In addition, when a plurality of periodic DL communications are configured, a combination of one or more fields included in the DCI may indicate one periodic DL communication to be deactivated among the plurality of periodic DL communications.

The terminal may perform a reception operation of the deactivation message (e.g., DCI). For example, the terminal may receive the DCI by using the G-CS-RNTI, and may identify that the periodic DL communication configured by the base station is deactivated based on a combination of one or more fields included in the DCI. In this case, the terminal may deactivate the periodic DL communication (S1207). Here, the terminal may periodically receive the common DCI. In addition, the terminal receiving the deactivation message (e.g., common DCI) may be a terminal capable of receiving a common PDSCH (e.g., common data). The common PDSCH may be downlink data transmitted periodically. In addition, the common PDSCH may be the same downlink data transmitted to a plurality of terminals.

After transmission of the deactivation message, the base station may stop the periodic DL communication deactivated by the deactivation message. In addition, the terminal may stop the periodic DL communication deactivated by the deactivation message received from the base station.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   performing a monitoring operation to receive bandwidth part (BWP) configuration information for common downlink communication from a base station;
   in response to receiving the BWP configuration information from the base station, configuring a common frequency region for the common downlink communication based on the BWP configuration information;
   receiving downlink control information (DCI) including scheduling information of the common downlink communication from the base station; and
   performing the common downlink communication with the base station in the common frequency region by using a frequency resource indicated by the scheduling information,
   wherein the common downlink communication is communication between the base station and a plurality of terminals including the terminal, and
   wherein when the BWP configuration information for configuring the common frequency region for the common downlink communication is not received from the base station, a frequency region in which a control resource set 0 (CORESET0) is configured is considered as the common frequency region.

2. The operation method according to claim 1, wherein a starting position of the common frequency region indicated by the BWP configuration information is indicated with reference to a Point A.

3. The operation method according to claim 1, wherein the DCI is scrambled by a common radio network temporary identifier (RNTI) for the common downlink communication.

4. The operation method according to claim 1, wherein a number of bits of frequency domain resource assignment (FDRA) in the scheduling information is determined based on a number of resource blocks (RBs) included in the common frequency region configured based on the BWP configuration information.

5. The operation method according to claim 1, wherein the BWP configuration information further includes information indicating rate-matching for the common frequency region, and downlink data in the common downlink communication is obtained by performing the rate-matching for the common frequency region.

6. The operation method according to claim 1, wherein a number of bits of FDRA in the scheduling information is determined based on a number of RBs included in the common frequency region configured based on the CORESET0, and the frequency resource indicated by the FDRA is limited within the frequency region of the CORESET0.

7. The operation method according to claim 1, wherein when the BWP configuration information is not received from the base station and the CORESET0 is not configured, the common frequency region is configured as a frequency region of an initial BWP.

8. The operation method according to claim 7, wherein a number of bits of FDRA in the scheduling information is determined based on a number of RBs included in the common frequency region configured based on the initial BWP, and the frequency resource indicated by the FDRA is limited within the frequency region of the initial BWP.

9. An operation method of a base station in a communication system, the operation method comprising:
   transmitting bandwidth part (BWP) configuration information for common downlink communication to a terminal;
   transmitting downlink control information (DCI) including scheduling information of the common downlink communication to the terminal; and
   performing the common downlink communication with the terminal within a common frequency region indicated by the BWP configuration information by using a frequency resource indicated by the scheduling information,
   wherein the common downlink communication is communication between the base station and a plurality of terminals including the terminal, and
   wherein when the BWP configuration information for configuring the common frequency region for the common downlink communication is not transmitted to the terminal, a frequency region in which a control resource set 0 (CORESET0) is configured is considered as the common frequency region.

10. The operation method according to claim 9, wherein a starting position of the common frequency region indicated by the BWP configuration information is indicated with reference to a Point A.

11. The operation method according to claim 9, wherein the DCI is scrambled by a common radio network temporary identifier (RNTI) for the common downlink communication.

12. The operation method according to claim 9, wherein a number of bits of frequency domain resource assignment (FDRA) in the scheduling information is determined based on a number of resource blocks (RBs) included in the common frequency region configured based on the BWP configuration information.

13. The operation method according to claim 9, wherein the BWP configuration information further includes information indicating rate-matching for the common frequency region, and downlink data in the common downlink communication is transmitted by performing the rate-matching for the common frequency region.

14. A terminal in a communication system, the terminal comprising:
   a processor;
   a memory electronically communicating with the processor; and
   instructions stored in the memory,
   wherein when executed by the processor, the instructions cause the terminal to:
   perform a monitoring operation to receive bandwidth part (BWP) configuration information for common downlink communication from a base station;
   in response to receiving the BWP configuration information from the base station, configure a common frequency region for the common downlink communication based on the BWP configuration information;

receive downlink control information (DCI) including scheduling information of the common downlink communication from the base station; and perform the common downlink communication with the base station in the common frequency region by using a frequency resource indicated by the scheduling information, wherein the common downlink communication is communication between the base station and a plurality of terminals including the terminal, and wherein when the BWP configuration information for configuring the common frequency region for the common downlink communication is not received from the base station, a frequency region in which a control resource set 0 (CORESET0) is configured is considered as the common frequency region.

15. The terminal according to claim 14, wherein a starting position of the common frequency region indicated by the BWP configuration information is indicated with reference to a Point A.

16. The terminal according to claim 14, wherein the DCI is scrambled by a common radio network temporary identifier (RNTI) for the common downlink communication.

17. The terminal according to claim 14, wherein a number of bits of frequency domain resource assignment (FDRA) in the scheduling information is determined based on a number of resource blocks (RBs) included in the common frequency region configured based on the BWP configuration information.

18. The terminal according to claim 14, wherein a number of bits of FDRA in the scheduling information is determined based on a number of RBs included in the common frequency region configured based on the CORESET0, and the frequency resource indicated by the FDRA is limited within the frequency region of the CORESET0.

19. The terminal according to claim 14, wherein when the BWP configuration information is not received from the base station and the CORESET0 is not configured, the common frequency region is configured as a frequency region of an initial BWP, a number of bits of FDRA in the scheduling information is determined based on a number of RBs included in the common frequency region configured based on the initial BWP, and the frequency resource indicated by the FDRA is limited within the frequency region of the initial BWP.

* * * * *